May 22, 1951  J. W. HIGHTOWER  2,553,766
WIRE LINE GUIDE FOR TRUCK BODIES
Filed June 7, 1948
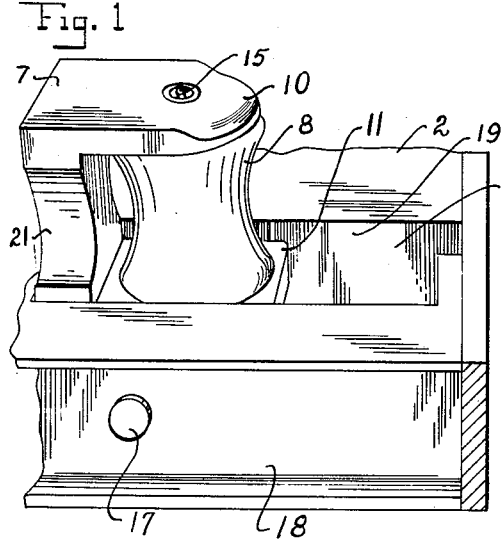
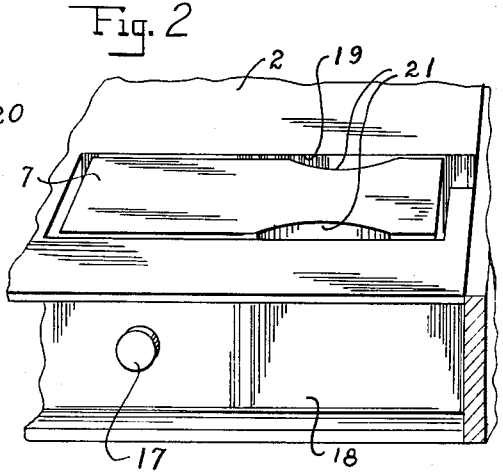
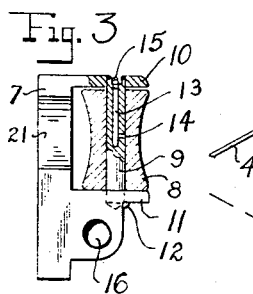
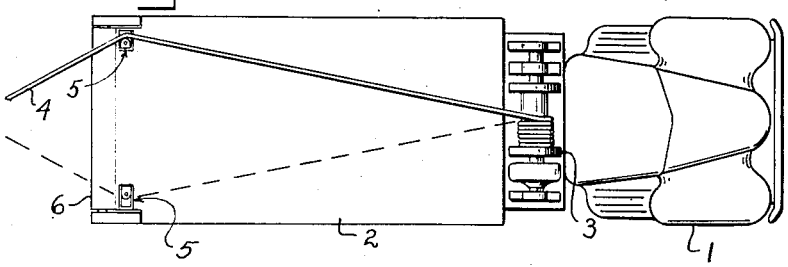
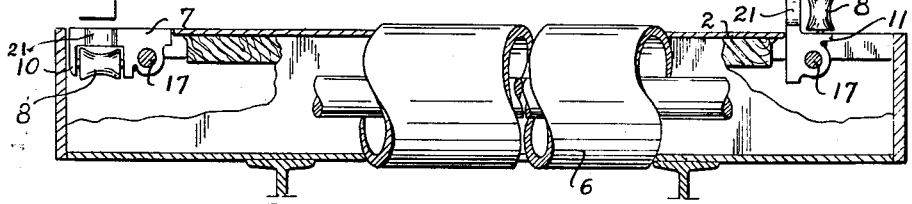
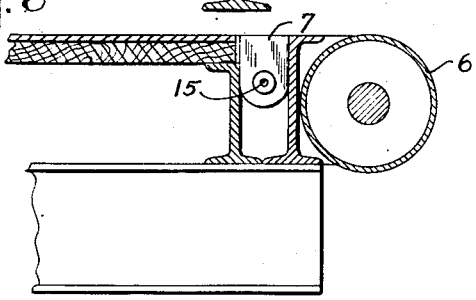
INVENTOR.
John W. Hightower
BY
Wayland D. Keith
HIS AGENT.

Patented May 22, 1951

2,553,766

UNITED STATES PATENT OFFICE 2,553,766

WIRE LINE GUIDE FOR TRUCK BODIES

John W. Hightower, Wichita Falls, Tex., assignor to Wichita Engineering Company, Wichita Falls, Tex., a corporation of Texas Application June 7, 1948, Serial No. 31,587

4 Claims. (Cl. 254—190)

This invention relates to improvements in wire line guide spools for truck bodies and vehicle bodies. And more particularly to wire line guide spools of the character that may be raised into vertical position when desired or lowered into the truck and vehicle body so as to form a flush surface when not in use.

Heretofore snatch blocks, pins, pegs, and the like have been used to divert the line of pull of wire lines in the pulling of heavy objects onto the truck or vehicle body which were cumbersome to use and often detrimental to the wire line.

An object of the present invention is to provide a wire line guide which may be readily positioned for use when it is desired to pull heavy objects onto a truck or vehicle body where the line of pull is at an angle with respect to the path on which the object is to be pulled onto the truck or vehicle body.

Another object of this invention is to provide a wire line guide member that may be readily positioned upright for the passing of a wire line therearound without having to thread the wire line therethrough, so that the wire line from a winch may be diverted at an angle with respect to the truck or vehicle body and a wire line guide member that may be folded into a recess in the truck or vehicle bed when not in use.

A still further object of this invention is to provide a wire line guide member that is simple in construction, easy to operate, and inexpensive to manufacture.

The present invention provides for a wire line guide member comprising a frame member which is pivoted about a horizontal axis that is in longitudinal alignment with the length of the truck body and which is adapted to be hinged or folded into a recess so that a portion of the frame member will form a surface substantially in the same plane as the top of the truck body and when hinged into an upright position on the axis of the wire line guide spool member will be substantially vertical with the back of the frame member facing toward a medial line passing longitudinally through the truck body and at right angles to the spooling surface of the winch on which the wire line is spooled. When the frame member of the wire line guide member is in an upright position, the back of the frame will be in abutting relation with a portion of the truck body so when the wire line is brought into contact relation with the spool of the wire line guide member that the spool will urge the frame of the wire line guide member inward which will hold this spool in substantially vertical position so that the cable may radiate outward therefrom at any acute angle.

An embodiment of the invention is illustrated in the accompanying drawings in which:

Fig. 1 is a fragmentary perspective view of a portion of a truck body showing the cable guide member hinged in upright or operating position;

Fig. 2 is a view similar to Fig. 1 with the cable guide member hinged into a recess so as to present a substantially plane surface on the truck bed;

Fig. 3 is a side elevational view of the cable guide member in upright position with parts broken away and shown in section to show the details of construction;

Fig. 4 is a top plan view of a truck having a truck body and winch thereon showing the invention applied to the truck body and showing a cable adapted to pass therearound;

Fig. 5 is a fragmentary elevational rear view of a truck body with parts broken away and shown in section and showing the invention installed on both sides of the truck body; and Fig. 6 is a section taken substantially on the line 6—6 Fig. 5 looking in the direction as indicated by the arrows.

With more specific reference to the drawings, the numeral 1 represents a conventional truck on which a truck body 2 is disposed. A winch mechanism 3 is disposed immediately forward of the truck body 2 and is arranged to wind a cable 4 thereon as indicated in Fig. 4. The cable 4 may be passed rearward from the winch and is adapted to pass around wire line guide members generally designated at 5, as will best be seen in Fig. 4.

The truck body 2 may have a tail-roller 6 positioned on the rear end thereof so that the cable 4 passing around wire line guide member 5 may pass downward thereover for drawing a heavy object up to and onto the truck body 2.

The present invention is shown in upright position in Figs. 1, 2, and the right hand end of Fig. 5 and is shown as folded into a recess in Figs. 2, 6, and the left hand end of Fig. 5. It will be readily appreciated that, when the frame member 7 of the wire line guide member is in the inoperative position as shown in Figs. 2 and 6, that the top portion of the frame member 7 forms a flat surface, and when in raised position the back portion of the frame member abuts with the truck body 2 which forms a brace to hold the frame member in upright position when a cable is passed around spool member 8.

The spool member 8 is journaled on an axial shaft 9 which passes through the upper projection 10 of frame member 7 and into the lower projection 11 of frame member 7. The shaft 9 projects through the projection 11 a sufficient amount to enable the shaft 9 to be welded at 12 to the projection 11, as will best be seen in Fig. 3. The shaft 9 has an axial opening 13 extending thereinto and intersecting a transverse hole 14 therein, which hole is so positioned as to direct a lubricant in to the interior of spool member 8 to furnish lubrication to the bearing surface thereon. A lubricant fitting 15 is recessed within a counter bore so as to protect the lubricant fitting from being knocked off by abnormal usage of the wire line guide member.

A hole 16 is provided through frame 7 at the lower end thereof as will be seen in Fig. 3, through which a pin 17 is adapted to pass, this pin 17 also passes through sill member 18 and 19 of truck body 2. The sill member 18 and 19 define a recess 20 into which the cable guide member 5 is adapted to fold when not in use. When the frame member 7 hinges about pin 17 the upper surface thereof, when in horizontal position, will form a substantially smooth surface with the top of the truck body 2. Recesses 21 are formed on both sides of frame member 7 to enable the gripping of said frame member for raising into upright position, when in flush position with respect to the truck bed as shown in Fig. 2.

In the operation of a winch on a truck, it is often desirable to make right turns with respect to the normal line of pull of the cable.

With the present invention a right angle turn may be accomplished either to the right or to the left by using the left or right wire line guide member respectively.

To use the wire line guide members, the frame 7 is raised from the recess 20 by gripping the frame at notches 21 which enables the member to readily be raised.

While the invention has been described in one embodiment thereof, it is to be understood that changes may be made in spirit of the invention as set out in the appended claims.

I claim:

1. In a wire line guide member for use with a vehicle body, a frame having spaced, out-turned projections, a hole formed in each of said projections, which holes are in axial alignment, an axial member positioned within said holes and having a spool fitted between said out-turned projections and journaled on said axial member, said frame member having a hole transversely therethrough substantially at right angles to the first mentioned holes and adapted to receive a pivot pin therethrough, said pivot pin adapted to be mounted on said vehicle body to permit swinging action of said frame member about said pivot point, said frame member having a substantially plane surface opposite said out-turned projections, said plane surface being adapted to coincide substantially with the upper surface of said vehicle body when in a horizontal position.

2. In a wire line guide member for use with a vehicle body, a frame having spaced, out-turned projections, a hole formed in each of said projections, which holes are in axial alignment, an axial member positioned within said holes and having a spool fitted between said out-turned projections and journaled on said axial member, said frame member having a hole transversely therethrough substantially at right angles to the first mentioned holes and adapted to receive a pivot pin therethrough, said pivot pin adapted to be mounted on said vehicle body to permit swinging action of said frame member about said pivot point, said frame member having a substantially plane surface opposite said out-turned projections, said plane surface being adapted to coincide substantially with the upper surface of said vehicle body when in a horizontal position, and said plane surface adapted to form an abutting relation with a portion of said vehicle body when said plane surface is in a vertical position.

3. In a wire line guide member for use with a vehicle body, a frame having spaced, out-turned projections, a hole formed in each of said projections, which holes are in axial alignment, an axial member positioned within said holes and having a spool fitted between said out-turned projections and journaled on said axial member, said frame member having a hole transversely therethrough substantially at right angles to the first mentioned holes and adapted to receive a pivot pin therethrough, said pivot pin adapted to be mounted on said vehicle body to permit swinging action of said frame member about said pivot point, said frame member having a substantially plane surface opposite said out-turned projections, said plane surface being adapted to coincide substantially with the upper surface of said vehicle body when in a horizontal position, said frame member adapted to have notches formed on either side to enable the raising thereof.

4. In combination with a vehicle having spaced frame members, load supporting surface carried by said frame members and having a recess formed in said surface between said frame members, a line guide pivotally supported between said frame members for movement into and out of said recess, said guide in one position being received in said recess in flush relation to said surface and in another position extending vertically above said surface, said guide comprising a spool supporting frame having a portion adapted to form a continuation of said surface when said guide is in said recess in flush relation to said surface, spaced projections at one side of said frame having aligned perforations formed therein, a line engaging spool journaled on an axis in said perforations the axis of said spool being horizontal when said guide is moved into said recess and substantially vertical when said guide is moved out of said recess.

JOHN W. HIGHTOWER.

REFERENCES CITED

The following references are of record in the file of this patent:

UNITED STATES PATENTS

| Number | Name | Date |
|---|---|---|
| 102,274 | Kendall | Apr. 26, 1870 |
| 1,546,737 | Latimer | July 21, 1925 |
| 2,105,476 | Fitch | Jan. 18, 1938 |
| 2,437,619 | Setz | Mar. 9, 1948 |
| 2,459,290 | Rozner | Jan. 18, 1949 |
| 2,497,379 | Vandergrift et al. | Feb. 14, 1950 |